June 2, 1925.
H. W. LANGBEIN
AUTOMOBILE BRAKE
Filed Dec. 27, 1922
2 Sheets-Sheet 1
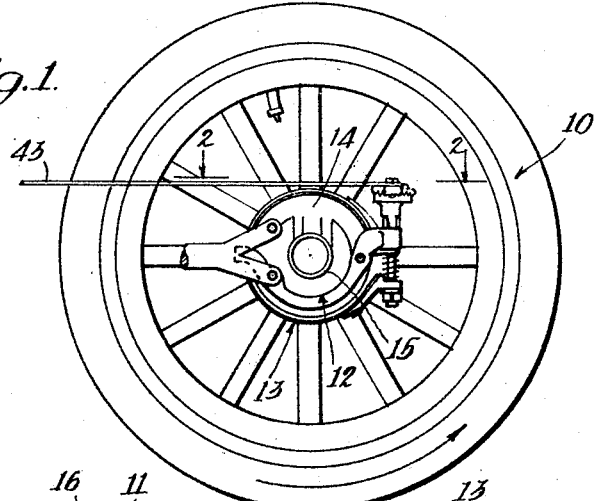
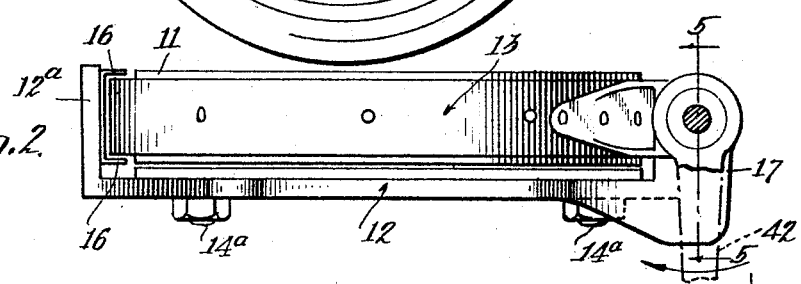
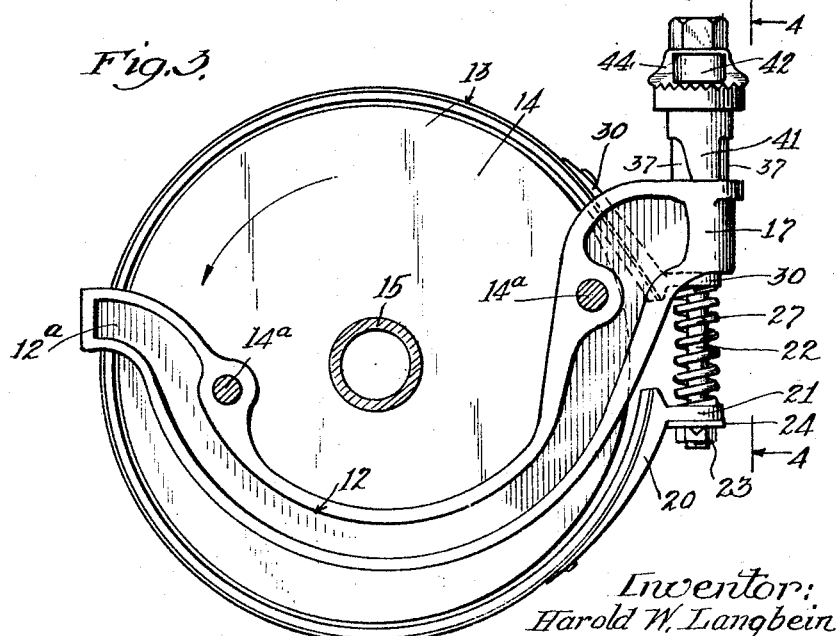
Inventor:
Harold W. Langbein
By James T. Burkelew
his Attorneys

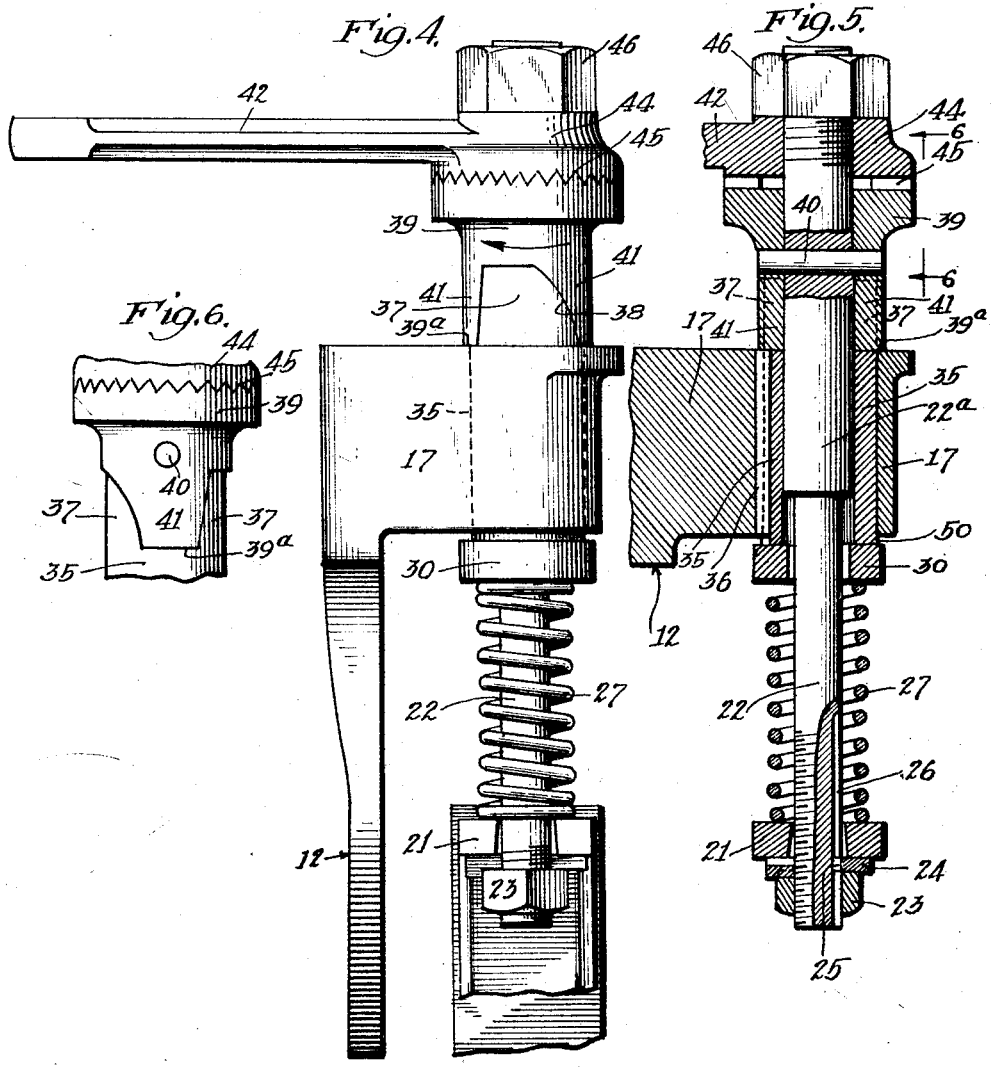

Patented June 2, 1925.

1,540,266

UNITED STATES PATENT OFFICE.

HAROLD W. LANGBEIN, OF LOS ANGELES, CALIFORNIA.

AUTOMOBILE BRAKE.

Application filed December 27, 1922. Serial No. 609,178.

*To all whom it may concern:*

Be it known that I, HAROLD W. LANG-BEIN, a citizen of the United States, residing in Los Angeles, county of Los Angeles, State of California, have invented new and useful Improvements in Automobile Brakes, of which the following is a specification.

This invention relates to brakes for vehicles, and particularly for automobiles; and the primary object of the invention is the provision of a brake mechanism that is simple and of highly efficient action.

It will be understood that my brake is applicable to all kinds of vehicles; and, in fact, is applicable even to other situations where friction brakes of the drum and band type are used. Therefore it will not be taken as a limitation on the invention that I explain it as an automobile or vehicle brake. Furthermore, explaining my invention as an automobile brake, I show it in the accompanying drawings with a frame designed to fit a particular type of automobile; but this is only for the purpose of making one illustrative application of my invention clear in all its details to those skilled in the art, and not for purposes of limiting the invention to the particular arrangement and details shown and described.

A great many of the brake bands in common use on automobiles and elsewhere are suspended or supported at a point about mid-way between the ends of the band; and then either one end of the band is fixed and the brake applying apparatus operates on the other end of the band; or the brake applying apparatus operates on both the ends of the band to pull them toward each other to tighten the band around the drum. In this kind of an arrangement, regardless of the direction of rotation of the brake drum (regardless of the direction of travel of the vehicle, whether forward or backward) the frictional action between the drum and band tends to "wrap" one half of the band around the drum and tends at all times to push the other half of the band off the drum. Thus, in such instances, efficient action is had only on one half of the brake band; and the other half of the brake band, being constantly pushed off the drum by this rotation, sometimes causes a chattering action.

In other brake constructions the brake band is mounted or hung at one of its ends; and the brake applying apparatus acts on the other end of the band. In this construction, when the brake drum is rotating in one direction, say forwardly, the band as a whole may have a tendency to wrap itself around the drum, due to the frictional effect between the band and the drum; but when the drum is rotating in the reverse direction, very low efficiency is obtained because then there is a tendency on the part of the drum to push the whole band away from the drum.

It is a general object of my invention to provide a brake mechanism that obtains the high efficiency of this "wrapping" action of the whole length of the brake band, regardless of the direction in which the drum is moving. How I obtain these results will be best understood from the following specification, reference for this purpose being had to the accompanying drawings in which—

Fig. 1 is an elevation showing my brakes applied to a typical automobile wheel;

Fig. 2 is an enlarged plan taken as indicated by line 2—2 on Fig. 1, showing the brake mechanism and the brake drum only;

Fig. 3 is a side elevation of the parts shown in Fig. 2;

Fig. 4 is a further enlarged end elevation taken as indicated by line 4—4 on Fig. 3;

Fig. 5 is a vertical section on line 5—5 of Fig. 2; and

Fig. 6 is a detail elevation taken as indicated by line 6—6 on Fig. 5.

In the drawings I show at 10 a typical automobile wheel to which the brake drum 11 is attached in any usual manner, and with which the brake drum revolves, the direction of revolution of this drum depending on whether the vehicle is going forward or rearward. The casting 12 that I here illustrate, to support my brake band 13, is designed to fit a particular type of machine; but, as I have said before, this and other details are not to be considered a limitation on the invention. This casting 12 is adapted to be mounted on studs 14ª that project from the inner face of the stationary plate 14 that closes the otherwise open inner end of brake drum 11; this plate usually being mounted directly on the rear axle housing 15. Thus casting 12 is mounted stationarily. At one end casting 12 has an extension 12ª that carries projections, in the form of a member 16, channel shaped to surround the brake band in the manner shown in Fig. 2 so as to keep it centrally located with reference to drum 11. At its other end this casting 12 has an extending lug 17 that carries the operating parts of the mechanism.

One end, the lower end, as shown in the drawings, of brake band 13 is secured to a member 20 that has a perforated lug 21 adapted to fit over the lower end of pin 22, being held in place by a nut 23 and a lock washer 24, the lock washer preferably having a tongue 25 that rides in a groove 26 in pin 22 to prevent rotation of the washer with relation to the pin. The details of the lock washer need not be explained as various types of lock washers are well known in the art. By setting nut 23 at any desired point the lower end of the brake band may be adjusted to adjust the normal clearance of the brake band around the drum. Above the member 20, 21 there is a coiled spring 27 that surrounds pin 22; and the upper end of this coil spring bears against a similar brake band end member 30 which also (but loosely) surrounds pin 22 and to which the upper end of the brake band is secured. This end member 30 is normally pressed upwardly by spring 27, while the end member 21 is normally pressed down by spring 27, thus normally expanding the band and maintaining the proper clearance around the brake drum; spring 27 being strong enough for this action.

Pin 22 extends upwardly through the casting lug 17, and the upper part 22ª of the pin is rotatable and vertically movable in a sleeve 35, that is vertically movable in casting lug 17 but is held from rotation by a spline 36. The lower end of sleeve 35 rests on brake band end member 30. Its upper end is provided with two or more cam members 37, one side of each of these members being provided with an inclined face 38. Directly above the upper end of the sleeve 35 is another member 39, preferably affixed to pin 22 by a key pin 40, and having cam lugs 41 shaped to interfit with cam lugs 37 of sleeve 35. The configuration of the sloping surfaces on these cam members may be of course suited to any particular brake mechanism; depending upon the amount of movement available, the leverage required, etc; but, whatever these arrangements may be, it will be seen that rotation of member 39 in the direction indicated by the arrow in Fig. 4, which is the direction indicated by the arrow in Fig. 2, will cause relative longitudinal movement between member 39 and sleeve 35, causing the sleeve 35 relatively to be pushed down and member 39 relatively to be raised, raising with it the pin 22. Thus, rotation of member 39 in the direction stated will cause a relative movement between sleeve 35 and pin 22 and will thus cause a relative movement between members 30 and 21, causing member 30 relatively to move downwardly and member 21 relatively to move upwardly, against the expanding action of spring 27.

In order to rotate member 39 I provide an arm 42 to which brake rod 43 (see Fig. 1) may be connected. This arm 42 has a head 44 that fits over the upper end of pin 22. The lower surface of head 44 and the upper surface of member 39 are provided with interengaging teeth 45, and head 44 is held down by a nut 46. This arrangement provides for relative adjustment of the position of arm 42 so that it may be placed, with reference to the mechanism and with reference to brake rod 43, in the most effective position.

From the description of the parts it will be readily seen that the sleeve 35, pin 22, and member 39, and all their attached parts, are not rigidly supported by casting 12 but "float" with reference to that casting. Normally, when the brake is not in use, these parts are supported by the lower end shoulder 39ª of member 39 bearing on the upper surface of stationary part 17 and there may be, as illustrated at 50, a small clearance between the lower surface of 17 and the upper surface of member 30. The downward movement of pin 22 and member 21, with reference to the frame is limited by end shoulder 39ª; the upward movement of member 30 is limited by its upper surface contacting with the lower surface of the frame, member 30 being larger in diameter than sleeve 35. But members 21 and 30 can be moved freely in the opposite directions—in directions relatively toward each other—opposed only by spring 27. When they are thus so moved toward each other it will be seen that then the whole mechanism is in "floating" relation to the frame and that the whole mechanism is then free to assume either a position in which member 30 bears up against the frame or a position in which member 39 bears down on the frame.

Suppose now that wheel 10 and brake drum 11 are rotated in the direction indicated by the arrows in Figs. 1 and 3 (the vehicle is moving forwardly). On the application of the brake, by moving arm 42 in the direction indicated, members 30 and 21 will be moved, relatively, towards each other. Now the action of the brake drum, rotating in the direction indicated, is to pull or keep member 30 up against casting lug 17, which it immediately does, as the frictional effect of the drum on the band is to wrap the band around the drum. The frictional effect of the drum on the band is also to raise the lower end of the band and to raise member 21. Consequently, the relative movement between members 21 and 30, in this particular case, is an upward movement of member 21, while member 30 bears upwardly against casting lug 17. Thus, on the application of the band to the drum rotating in the direction indicated, the end 30 of the brake band is relatively fixed while the end 21 of the brake band is moved upwardly both by the action of the brake applying mechanism and by the "wrapping" action of the drum on the band.

Now suppose the brake drum to be rotating in the opposite direction (the vehicle to be moving backwardly). In that case, as soon as the brake is applied and the band comes into contact with the drum, there is a tendency to move the band around in the same direction that the drum is rotating, and the end member 21 of the band (lower end of the band) is drawn downwardly, so that end member 21 bears down on nut 23, and the lower end of the band is then rigidly supported by the pin 22 and by the lower end shoulder 39ª of member 39 resting on the upper surface of casting lug 17. At the same time, the tendency of the band to wrap itself around the drum, causes a tendency of the upper end of the band, with the member 30, to move downwardly. So, in that case, the relative movement of members 30 and 21 toward each other comprises a movement of member 30 downwardly. To accomplish this movement, it will be readily seen that sleeve 35 moves downwardly through casting lug 17, member 39 remaining stationary as regards vertical movement with reference to lug 17.

It will thus be seen that my mechanism does, in fact, move either one or the other of the brake band ends toward the other end of the brake band; and it depends upon the direction of rotation of the brake drum which band end is actually moved toward the other. In either case, I have a relative movement of the brake band ends toward each other, thus compressing the band around the drum; but in any case it will be seen that the end of the band that is pulled upon by the frictional effect of the drum on the band is always held stationary, while it is the other end of the band that is actually moved. Thus, regardless of direction of rotation of the drum, I take advantage of the wrapping action of the band around the drum; and I pull the band around the drum in the same direction as the band tends to move by frictional engagement with the drum. Thus, in all cases, the action of the drum on the band is to tighten the band rather than to loosen it, and the full efficiency of braking action, for the whole length of the band, is had; and all tendency to chattering is eliminated.

Having described a preferred form of my invention, I claim:

1. A brake that embodies a drum and a surrounding band with two ends, a rigid frame, a pin movable longitudinally with reference to the frame in one direction, one end of the brake band being connected with said pin, a sleeve surrounding said pin and movable with relation to the frame in a direction opposite to that in which the pin is movable, the other end of the brake band being operatively connected with said sleeve, and means to move said pin and sleeve with relation to each other.

2. A brake that embodies a drum and a surrounding band with two ends, a rigid frame, a pin movable longitudinally with reference to the frame in one direction, one end of the brake band being connected with said pin, a sleeve surrounding said pin and movable with relation to the frame in a direction opposite to that in which the pin is movable, the other end of the brake band being operatively connected with said sleeve, and means to move said pin and sleeve with relation to each other, said means embodying two relatively rotatable cam members one mounted on the sleeve and the other mounted on the pin.

3. A brake that embodies a drum and a surrounding band with two ends, a rigid frame, a sleeve mounted in the frame to move longitudinally therein but restrained from rotational movement in the frame, a cam member carried on one end of the sleeve, a longitudinally movable pin extending through the sleeve, a co-acting cam member mounted on one end of the pin and forming a stop to limit movement of the pin in a direction toward its other end with reference to the frame, means to rotate the last mentioned cam member, said pin projecting beyond the sleeve at its last mentioned end, means to connect one end of the brake band with the last mentioned end of the pin, and means to operatively connect the other end of the brake band with the sleeve, the longitudinal movement of the sleeve, with reference to the frame, in a direction toward its cam member end being limited.

4. A brake that embodies a drum and a surrounding band with two ends, a stationary frame having a bore therethrough, a sleeve slidable in the bore, a pin slidable in the sleeve, means operatively connecting one band end with the pin and the other band end with the sleeve, and means to cause relative longitudinal movement between the pin and sleeve.

5. A brake that embodies a drum and a surrounding band with two ends, a stationary frame having a bore therethrough, a sleeve slidable in the bore, a pin slidable in the sleeve, means operatively connecting one band end with the pin and the other band end with the sleeve, and means to cause relative longitudinal movement between the pin and sleeve, said last mentioned means also embodying a stop to limit movement of the pin in one direction with relation to the frame, and the means connecting the band end with the sleeve also embodying a stop to limit movement of that band end in the opposite direction with relation to the frame.

In witness that I claim the foregoing I have hereunto subscribed my name this 19th day of December, 1922.

HAROLD W. LANGBEIN.